US012804473B2

(12) United States Patent
Soma

(10) Patent No.: US 12,804,473 B2
(45) Date of Patent: Nov. 17, 2026

(54) COMMUNICATION APPARATUS, CONTROL METHOD OF COMMUNICATION APPARATUS, AND COMPUTER-READABLE STORAGE MEDIUM TO DECIDE A COMMUNICATION DATA RATE TO REDUCE DELAY

(71) Applicant: CANON KABUSHIKI KAISHA, Tokyo (JP)

(72) Inventor: Tomoyasu Soma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 18/482,474

(22) Filed: Oct. 6, 2023

(65) Prior Publication Data

US 2024/0040437 A1 Feb. 1, 2024

Related U.S. Application Data

(63) Continuation of application No. PCT/JP2022/014803, filed on Mar. 28, 2022.

(30) Foreign Application Priority Data

Apr. 7, 2021 (JP) ................................ 2021-065367

(51) Int. Cl.

| | |
|---|---|
| ***H04W 28/22*** | (2009.01) |
| ***H04L 27/26*** | (2006.01) |
| ***H04W 28/20*** | (2009.01) |

(52) U.S. Cl.

CPC ......... *H04W 28/22* (2013.01); *H04L 27/2666* (2013.01); *H04W 28/20* (2013.01)

(58) Field of Classification Search

None

See application file for complete search history.

(56) References Cited

U.S. PATENT DOCUMENTS

2007/0237217 A1* 10/2007 Shen .................... H04L 1/0003 375/259

2009/0323641 A1 12/2009 Futagi et al.

(Continued)

FOREIGN PATENT DOCUMENTS

CN 102763452 A 10/2012

EP 3213563 B1 11/2018

(Continued)

*Primary Examiner* — Christine T Duong

(74) *Attorney, Agent, or Firm* — Canon U.S.A., Inc. IP Division

(57) ABSTRACT

A communication apparatus receives, from at least one other communication apparatus wirelessly connected to the communication apparatus, first information representing a permissible delay time until completion of data reception by the communication apparatus after data transmission by the at least one other communication apparatus, and a data length of data transmitted at once by the at least one other communication apparatus, which are requested by the at least one other communication apparatus, decides, based on the first information, a data rate used for communication with the at least one other communication apparatus, and notifies the at least one other communication apparatus of second information about the decided data rate.

9 Claims, 11 Drawing Sheets

(56) References Cited

U.S. PATENT DOCUMENTS

| | | | | |
|---|---|---|---|---|
| 2014/0295790 | A1* | 10/2014 | Vos | H04M 15/8027 455/406 |
| 2016/0127997 | A1 | 5/2016 | Ang | |
| 2018/0062713 | A1* | 3/2018 | Adachi | H04W 84/12 |
| 2018/0077723 | A1 | 3/2018 | Adachi | |
| 2021/0184787 | A1 | 6/2021 | Iwabuchi et al. | |

FOREIGN PATENT DOCUMENTS

| | | | |
|---|---|---|---|
| EP | 3681199 | A1 | 7/2020 |
| JP | 2004129085 | A | 4/2004 |
| JP | 2017539121 | A | 12/2017 |
| JP | 2018050133 | A | 3/2018 |
| KR | 20130018219 | A | 2/2013 |
| KR | 20170075745 | A | 7/2017 |
| KR | 20190083489 | A | 7/2019 |
| WO | 2008056774 | A1 | 5/2008 |
| WO | 2016070004 | A1 | 5/2016 |
| WO | 2019049212 | A1 | 3/2019 |

* cited by examiner

| Control ID Value | Meaning |
|---|---|
| 0 | Triggered response scheduling(TRS) |
| 1 | Operating mode(OM) |
| : | : |
| 7-14 | Reserved |
| 15 | Ones need expantion surely(ONES) |

FIG. 9

26-tone RU, BANDWIDTH 20 MHz, NUMBER OF STREAMS N=1

| MCS index | Modulation | R | Data Rate(Mb/s) | | |
|---|---|---|---|---|---|
| | | | 0.8 µs GI | 1.6 µs GI | 3.2 µs GI |
| 0 | BPSK | 1/2 | 0.9 | 0.8 | 0.8 |
| 1 | QPSK | 1/2 | 1.8 | 1.7 | 1.5 |
| 2 | | 3/4 | 2.6 | 2.5 | 2.3 |
| 3 | 16-QAM | 1/2 | 3.5 | 3.3 | 3.0 |
| 4 | | 3/4 | 5.3 | 5.0 | 4.5 |

⋮

| | | | | | |
|---|---|---|---|---|---|
| 13 | 4096-QAM | 5/6 | 17.6 | 16.7 | 15.0 |

COMMUNICATION APPARATUS, CONTROL METHOD OF COMMUNICATION APPARATUS, AND COMPUTER-READABLE STORAGE MEDIUM TO DECIDE A COMMUNICATION DATA RATE TO REDUCE DELAY

CROSS-REFERENCE TO RELATED APPLICATIONS

This application is a Continuation of International Patent Application No. PCT/JP2022/014803, filed Mar. 28, 2022, which claims the benefit of Japanese Patent Application No. 2021-065367 filed Apr. 7, 2021, both of which are hereby incorporated by reference herein in their entireties.

BACKGROUND OF THE INVENTION

Field of the Invention

The present invention relates to a wireless communication technique.

Background Art

These days, the usage of the Internet is increasing year by year along with the development of the information communication technology. To meet increasing demands, various communication techniques are being developed. Among these techniques, a wireless LAN (Local Area Network) technique implements a high throughput in Internet communication of packet data, audio, video, and the like by a wireless LAN terminal, and a wide variety of technical developments are in progress actively.

In the development of the wireless LAN technique, many standardization operations by Institute of Electrical and Electronics Engineers (IEEE), which is a standardization institute for the wireless LAN technique, play an important role. As a wireless LAN communication standard, the IEEE 802.11 series is known. The IEEE 802.11 series standards include the IEEE 802.11a/b/g/n/ac/ax standards. Japanese Patent Laid-Open No. 2018-50133 discloses a method of executing wireless communication by Orthogonal Frequency Division Multiple Access (OFDMA) in the IEEE 802.11ax standard. The IEEE 802.11ax standard implements a high throughput by executing wireless communication by OFDMA.

Recently, the establishment of the IEEE 802.11be standard is examined as a new standard of IEEE 802.11 series. The IEEE 802.11be standard implements high frequency use efficiency by using OFDMA, similar to IEEE 802.11ax. In addition, a technique regarding a low delay is examined for application to periodic control applications of robot control and the like.

The wireless LAN system adopts automatic retransmission control as a mechanism for enhancing the reliability of wireless communication. As a method of implementing low-delay communication, it is considered to shorten the data transmission time by increasing the communication data rate (communication rate). However, as the communication data rate increases, a data transmission error (communication error) more readily occurs and the delay time due to retransmission processing increases. In the periodic control applications of robot control and the like, if the communication data rate is excessively decreased to suppress generation of a communication error, the data transmission time may become longer than the control data transmission interval.

SUMMARY OF THE INVENTION

Various embodiments of the present invention decide a communication data rate to reduce a delay caused by a communication error.

A communication apparatus according to the present invention has the following arrangement. That is, a communication apparatus comprises a reception unit configured to receive, from at least one other communication apparatus wirelessly connected to the communication apparatus, first information representing a permissible delay time until completion of data reception by the communication apparatus after data transmission by the at least one other communication apparatus, and a data length of data transmitted at once by the at least one other communication apparatus, which are requested by the at least one other communication apparatus, a decision unit configured to decide, based on the first information, a data rate used for communication with the at least one other communication apparatus, and a notifying unit configured to notify the at least one other communication apparatus of second information about the decided data rate.

A communication apparatus according to the present invention is a communication apparatus comprising: a reception unit configured to receive, from at least one other communication apparatus wirelessly connected to the communication apparatus, first information representing a requested data rate requested by the at least one other communication apparatus; a decision unit configured to decide, based on the first information, a data rate used for communication with the at least one other communication apparatus; and a notifying unit configured to notify the at least one other communication apparatus of second information about the decided data rate.

A communication apparatus according to the present invention is a communication apparatus comprising: a transmission unit configured to transmit first information to another communication apparatus; and a reception unit configured to receive, from the other communication apparatus, second information about a data rate that is decided by the other communication apparatus based on the first information and used for communication with the other communication apparatus, wherein the first information represents a permissible delay time until completion of data reception by the communication apparatus after data transmission by the communication apparatus, and a data length of data transmitted at once by the communication apparatus, which are requested by the communication apparatus, or represents a requested data rate calculated by the communication apparatus from the permissible delay time and the data length.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 9 shows an example of a table representing a theoretical data rate.

DESCRIPTION OF THE EMBODIMENTS

Figure 1:
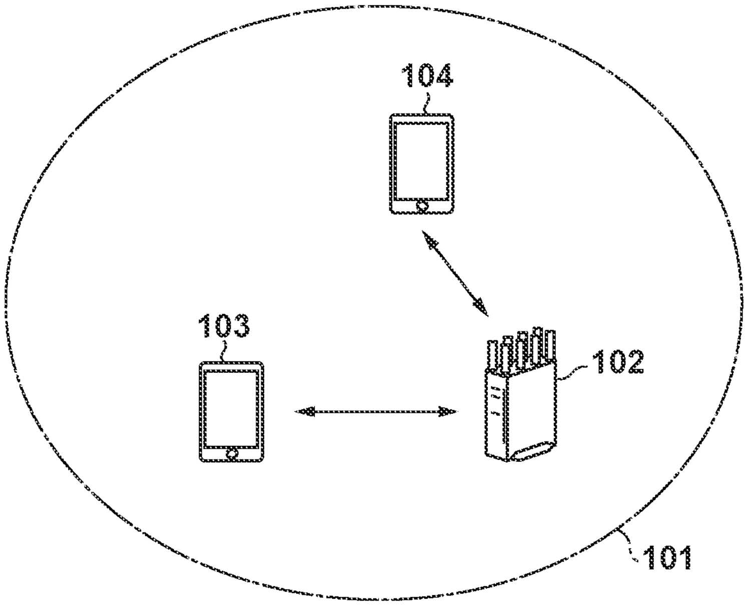
FIG. 1 is a view showing an example of the configuration of a wireless communication network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (Network Configuration)

FIG. 1 shows an example of the configuration of a wireless communication network according to the embodiment. A wireless communication network 101 includes one access point (AP 102) and one or more stations (STAs/terminal apparatuses) (STAs 103 and 104). The AP 102 and the STAs 103 and 104 can be communication apparatuses (be devices) compliant with the IEEE 802.11be standard.

Each communication apparatus can communicate in the 2.4 GHz, 5 GHz, and 6 GHz frequency bands. A frequency band used by each communication apparatus is not limited to them and another frequency band such as the 60 GHz band may be used. Also, each communication apparatus can communicate using any one of the 20 MHz, 40 MHz, 80 MHz, 160 MHz, and 320 MHz band widths. The AP 102 and the STAs 103 and 104 can implement multi-user (MU) communication in which signals of a plurality of users (STAs) are multiplexed by executing OFDMA communication.

The AP 102 and the STAs 103 and 104 may be able to execute Multiple-Input and Multiple-Output (MIMO) communication. In this case, the AP 102 and the STAs 103 and 104 include a plurality of antennas, and one side sends different signals from the respective antennas using the same frequency channel. The receiving side simultaneously receives all the signals arriving from a plurality of streams using a plurality of antennas, demultiplexes the signals of the respective streams, and decodes them. By executing MIMO communication, the AP 102 and the STAs 103 and 104 can communicate much more data within the same time, compared to a case where MIMO communication is not executed. The AP 102 can establish a radio link with the STAs 103 and 104 via a connection process such as an association process compliant with the IEEE 802.11 series standard. Note that the configuration of the wireless communication network shown in FIG. 1 is merely an example for description. For example, a network including many be devices, ax devices, and legacy devices (devices compliant with the IEEE 802.11a/b/g/n/ac standards) may be configured in a wider area. The AP 102 and the STAs 103 and 104 may support legacy standards (IEEE 802.11a/b/g/n/ac standards) preceding IEEE 802.11ax. The AP 102 and the STAs 103 and 104 may support other communication standards such as Bluetooth®, Near Field Communication (NFC), Ultra Wide Band (UWB), Zigbee, and Multi Band OFDM Alliance (MBOA). UWB includes wireless USB, wireless 1394, and Winet. The AP 102 and the STAs 103 and 104 may support a communication standard of wired communication such as wired LAN.

Examples of the AP 102 are a wireless LAN router and a PC, but the AP 102 is not limited to them. The AP 102 need only be a communication apparatus capable of executing OFDMA communication with another communication apparatus. The AP 102 may be an information processing apparatus such as a radio chip capable of executing wireless communication compliant with the IEEE 802.11be standard. Examples of the STAs 103 and 104 are a camera, a tablet, a smartphone, a PC, a mobile phone, and a video camera, but the STAs 103 and 104 are not limited to them. The STAs 103 and 104 need only be communication apparatuses capable of executing OFDMA communication with another communication apparatus. The STAs 103 and 104 may be an information processing apparatus such as a radio chip capable of executing wireless communication compliant with the IEEE 802.11be standard. The network in FIG. 1 is constituted by one AP and two STAs, but the numbers of APs and STAs are not limited to them. Note that an information processing apparatus such as a radio chip includes an antenna for transmitting a generated signal.

(Hardware Arrangement of AP and STA)

Figure 2:
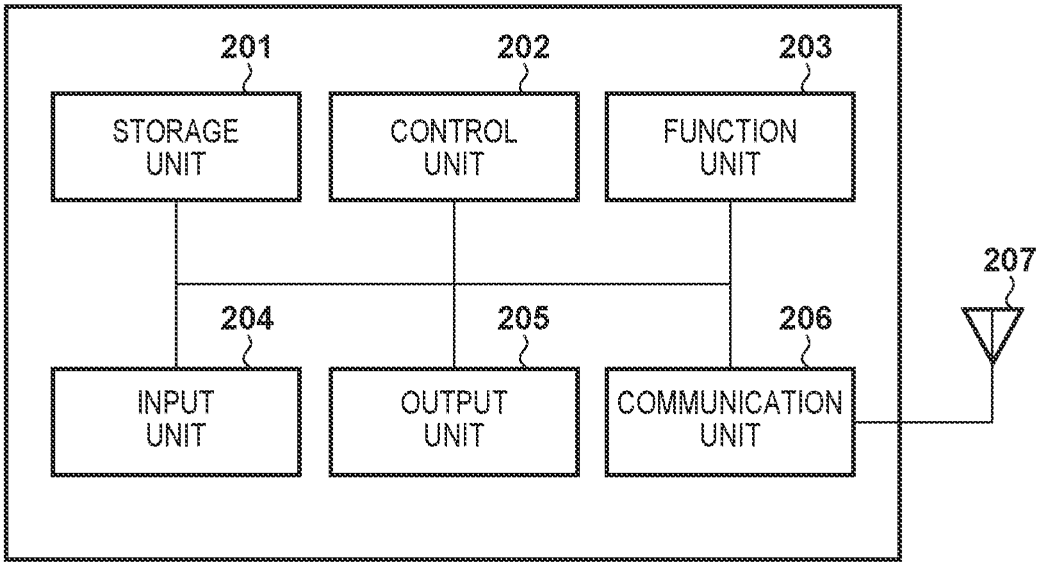
FIG. 2 is a block diagram showing an example of the hardware arrangement of an AP and STA.

FIG. 2 shows an example of the hardware arrangement of the AP 102. Note that the STAs 103 and 104 have a hardware arrangement similar to that of the AP 102 and in this case, a communication partner apparatus can be the AP 102. As an example of the hardware arrangement, the AP 102 includes a storage unit 201, a control unit 202, a function unit 203, an input unit 204, an output unit 205, a communication unit 206, and an antenna 207.

The storage unit 201 is constituted by one or more memories such as a Read Only Memory (ROM) and a Random Access Memory (RAM), and stores computer programs for performing various operations (to be described later) and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 201. The storage unit 201 may include a plurality of memories or the like.

The communication unit 206 controls wireless communication compliant with the IEEE 802.11be standard. In addition to the IEEE 802.11be standard, the communication unit 206 may control wireless communication compliant with another IEEE 802.11 series standard, and wired communication such as a wired LAN. The communication unit 206 controls the antenna 207 to transmit and receive signals for wireless communication generated by the control unit 202. The AP 102 may include a plurality of communication units 206. When establishing a plurality of links in multilink communication, the AP 102 including a plurality of communication units 206 establishes at least one link for one communication unit 206. Alternatively, the AP 102 may establish a plurality of links using one communication unit 206. In this case, the communication unit 206 executes communication via a plurality of links by switching a frequency channel operating in time division. When the AP 102 supports the NFC standard, the Bluetooth standard, and the like in addition to the IEEE 802.11be standard, it may control wireless communication compliant with these communication standards. When the AP 102 can execute wireless communication compliant with a plurality of communication standards, it may individually include communication units and antennas corresponding to the respective communication standards. The AP 102 communicates data such as image data, document data, or video data with the STAs 103 and 104 via the communication unit 206. Note that the antenna 207 may be constituted as a unit separate from the communication unit 206 or as one module together with the communication unit 206.

The antenna 207 is an antenna capable of communication in frequency bands such as the 2.4 GHz band, 5 GHz band, and 6 GHz band. In the embodiment, the AP 102 includes one antenna, but may include different antennas for respective frequency bands. When the AP 102 includes a plurality of antennas, it may include the communication units 206 corresponding to the respective antennas.

(Functional Arrangement of STA)

Figure 3:
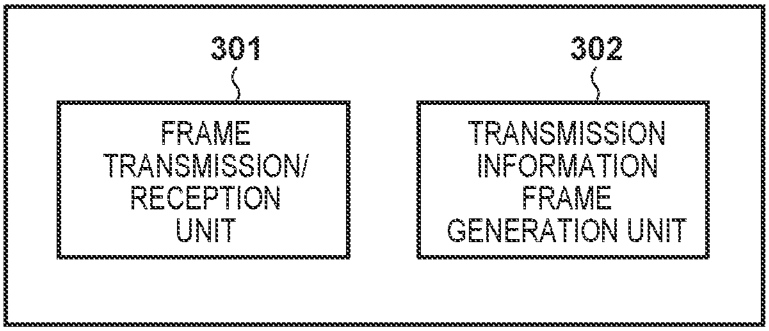
FIG. 3 is a block diagram showing an example of the functional arrangement of the STA.

FIG. 3 shows an example of the functional arrangement of the STAs 103 and 104. Although the STA 103 will be exemplified, the STA 104 has a functional arrangement similar to that of the STA 103. As an example of the functional arrangement, the STA 103 includes a frame transmission/reception unit 301 and a transmission information frame generation unit 302.

The frame transmission/reception unit 301 controls transmission/reception of a frame such as a Media Access Control (MAC) frame (management frame, control frame, or data frame). In the embodiment, the frame transmission/reception unit 301 controls reception of a trigger frame included in a control frame. The frame transmission/reception unit 301 can manage transmission of all data and determine whether to end the transmission of all data.

The transmission information frame generation unit 302 generates a frame for notifying the AP 102 of transmission information of data subjected to Uplink Multi-User (UL-MU) transmission. The transmission information can include a permissible delay time, a data length, a permissible error rate, and information about power consumption that are requested of the AP 102. The transmission information can be stored in a MAC frame.

The transmission information will be explained in more detail. When a time until the completion of data reception by the AP 102 after data transmission by the STA 103 is defined as a data transmission time, the permissible delay time represents a maximum data transmission time permitted by the STA 103. The data length represents the length of data transmitted at once by the STA 103 in response to one trigger frame. The permissible error rate represents a maximum error rate permitted by the system. The information about power consumption represents whether to give priority to power consumption (whether to request power-saving communication). The user of the system can input in advance, to the STA 103 via a User Interface (UI) such as the input unit 204, pieces of information such as the permissible delay time, the data amount, the permissible error rate, and the information about power consumption. The transmission information frame generation unit 302 can set the input pieces of information in the MAC frame. An example of a subfield representing (the value of) each piece of information will be described later with reference to FIG. 5.

A frame that announces transmission information can be a MAC frame. Alternatively, a frame that announces transmission information may be a new frame created using Subtype value indicating Reserved in an extension frame or Element ID indicating Reserved in Element. In this manner, a frame that announces transmission information is not limited to a frame of a specific form.

Figure 5:
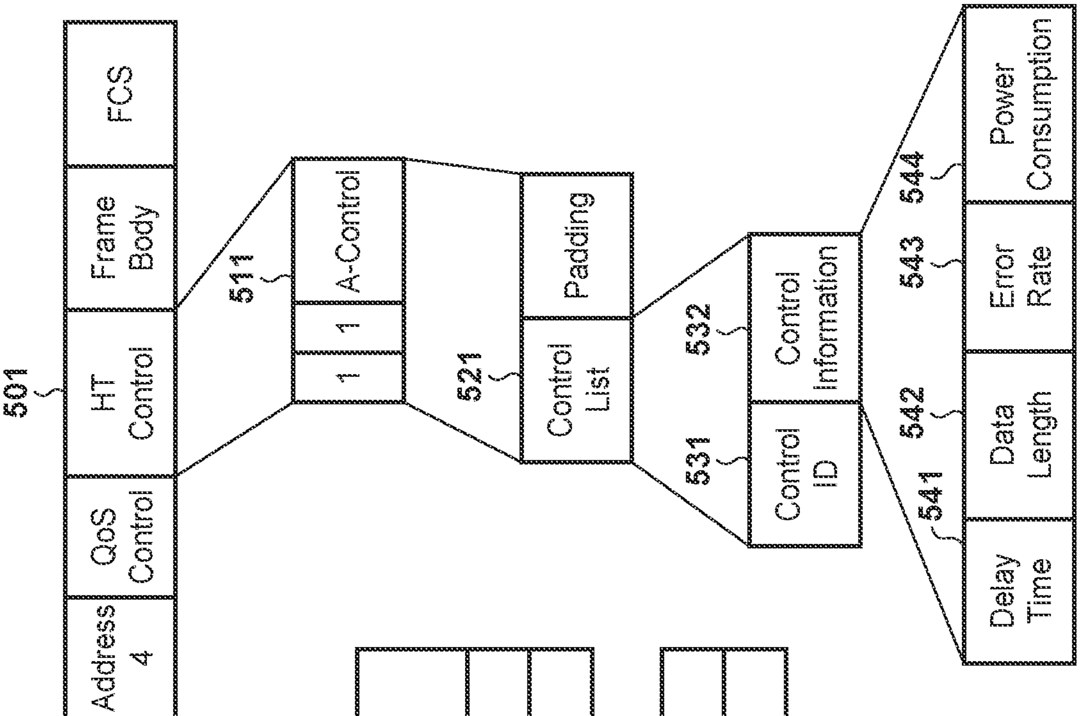
FIG. 5 is a view showing an example of the structure of a MAC frame that announces transmission information.

FIG. 5 shows an example of the structure of a MAC frame that announces transmission information. The MAC frame is a frame complying with a high Efficiency (HE) format. A Control List field 521 in an A-Control field 511 included in a HT Control field 501 of the MAC frame shown in FIG. 5 is constituted as follows. That is, a new ID is created for the value of a Control ID field 531 by using a value (=7 to 14) indicating Reserved in Control ID value shown in a table included in FIG. 5. In correspondence with this, a Delay Time subfield 541 indicating a permissible delay time, a Data Length subfield 542 indicating a data length, an Error Rate subfield 543 indicating a permissible error rate, and a Power Consumption subfield 544 indicating information about power consumption are set in a Control Information field 532.

(Functional Arrangement of AP)

Figure 4:
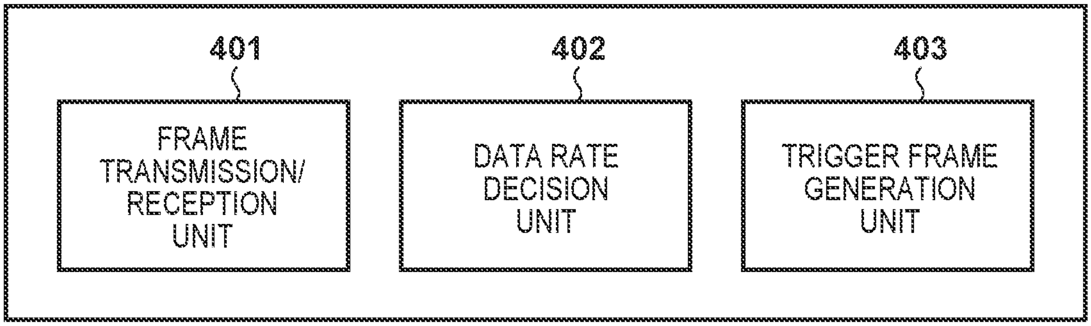
FIG. 4 is a block diagram showing an example of the functional arrangement of the AP.

FIG. 4 shows an example of the functional arrangement of the AP 102. As an example of the functional arrangement, the AP 102 includes a frame transmission/reception unit 401, a data rate decision unit 402, and a trigger frame generation unit 403. The frame transmission/reception unit 401 controls transmission/reception of a frame such as a MAC frame (management frame, control frame, or data frame). In the embodiment, the frame transmission/reception unit 401 controls transmission of a trigger frame included in a control frame. The frame transmission/reception unit 401 can determine whether an error has occurred in communication.

The data rate decision unit 402 decides, based on transmission information included in a frame received by the frame transmission/reception unit 401, a data rate (communication rate) used in UL-MU communication with the STAs 103 and 104 with which a radio link is established (wirelessly connected). Details of the data rate decision method will be described later.

The trigger frame generation unit 403 generates a trigger frame including information (parameter) for implementing the data rate decided by the data rate decision unit 402. The generated trigger frame is transmitted by the frame transmission/reception unit 401 to the STAs 103 and 104. Upon receiving the trigger frame, the STAs 103 and 104 can perform UL-MU transmission by OFDMA based on the contents of the trigger frame. As will be described later, trigger frames are classified into two types: a normal trigger frame and a retransmission trigger frame.

Figure 6:
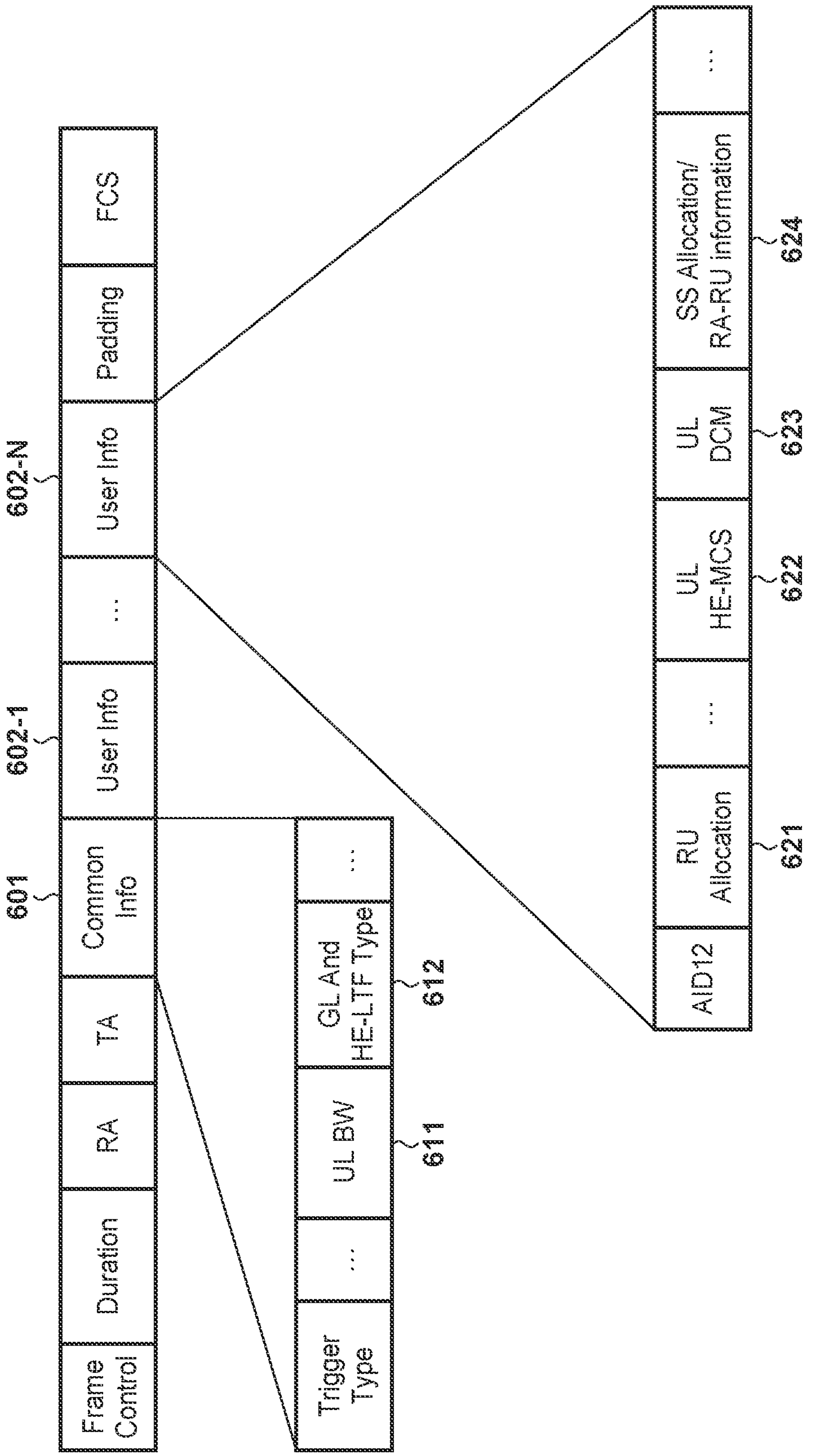
FIG. 6 is a view showing an example of the structure of a trigger frame.

FIG. 6 shows an example of the structure of the trigger frame. The trigger frame includes a Common Info field 601 including information common to a plurality of STAs multiplexed by OFDMA, and User Info fields 602-1 to 602-N (to be generally referred to as a User Info field 602) each including information unique to each STA multiplexed by OFDMA. For example, pieces of information (parameters) for implementing a data rate decided by the data rate decision unit 402 can be set in an Uplink Bandwidth (UL BW) subfield 611 and a GI And HE-LTF Type subfield 612 within the Common Info field 601, and an RU Allocation subfield 621, a UL HE-MCS subfield 622, a UL DCM subfield 623, and an SS Allocation/RA-RU information subfield 624 within the User Info field 602. The UL BW subfield 611 can represent a frequency bandwidth. The GI And HE-LTF Type subfield 612 can represent the length of a guard interval. The guard interval is an interval inserted between transmitted symbols (bits). The RU Allocation subfield 621 can represent the allocation of a resource unit (RU). The UL HE-MCS subfield 622 and the UL DCM subfield 623 can represent Modulation and Coding Scheme (MCS). The SS Allocation/RA-RU information subfield 624 can represent the number of spatial streams. The trigger frame in which pieces of information are set is transmitted to the STAs 103 and 104.

(Processing of STA)

Figure 7:
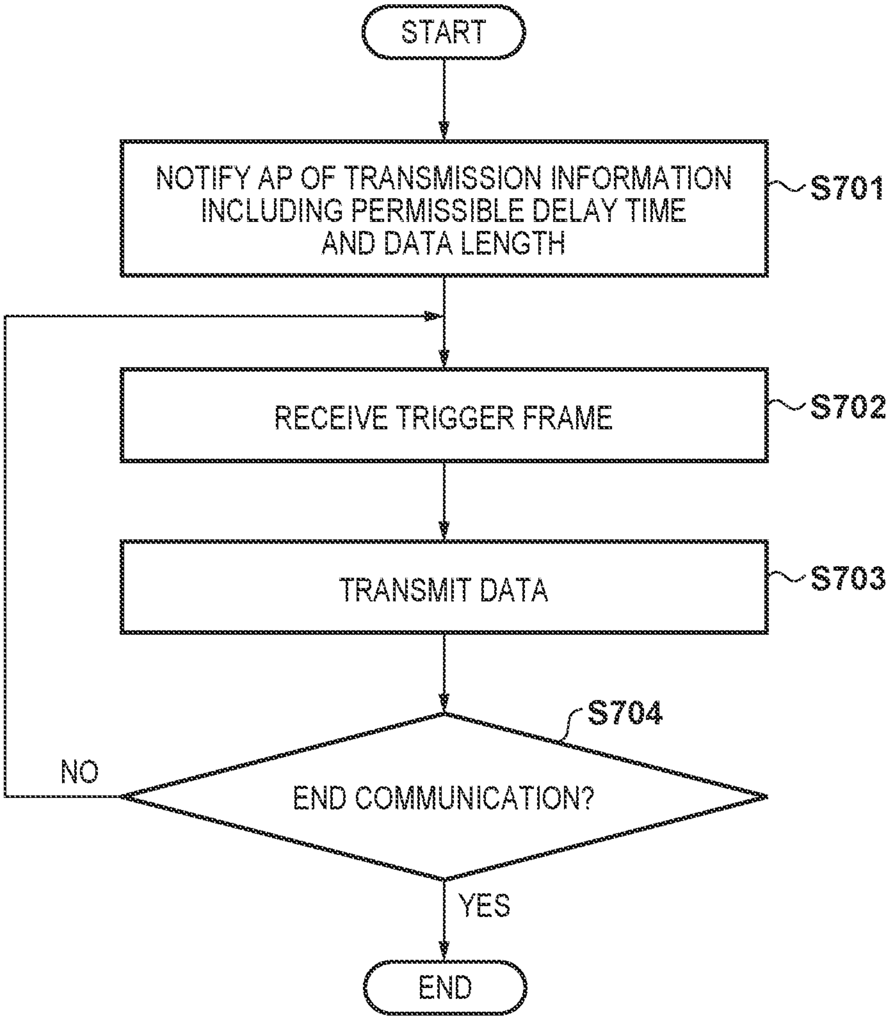
FIG. 7 is a flowchart showing processing executed by the STA according to the first embodiment.

Next, processing executed by the STAs 103 and 104 having the above-described arrangement will be explained. FIG. 7 is a flowchart showing processing executed by the STAs 103 and 104 according to the embodiment. Although the STA 103 will be exemplified here, the STA 104 can also perform similar processing. The processing sequence can be executed by reading out a computer program stored in the storage unit 201 and executing it by the control unit 202 when the STA 103 starts communication.

First, the transmission information frame generation unit 302 of the STA 103 generates a frame including transmission information. In the embodiment, the transmission information frame generation unit 302 sets, in the transmission information, at least a permissible delay time and data length requested of the AP 102. The frame transmission/reception unit 301 transmits the frame to the AP 102 to notify (transmit) the AP 102 of the transmission information including the permissible delay time and the data length (step S701). Then, the frame transmission/reception unit 301 of the STA 103 receives a trigger frame (step S702), generates data based on information that is included in the trigger frame and related to a data rate decided by the AP 102, and transmits the data (step S703). Trigger frames are classified into two types: a normal trigger frame and a retransmission trigger frame. The frame transmission/reception unit 301 executes transmission or retransmission of data in accordance with the type of trigger frame.

Upon completion of the processing in step S703, the frame transmission/reception unit 301 of the STA 103 determines whether to end the communication (step S704). If transmission of all data is completed and there is no data to be successively transmitted, the frame transmission/reception unit 301 determines to end the communication (YES in step S704), and the process ends. If there is data to be successively transmitted, the frame transmission/reception unit 301 determines not to end the communication (NO in step S704), and the process returns to step S702 to repetitively perform the processing.

(Processing of AP)

Figure 8:
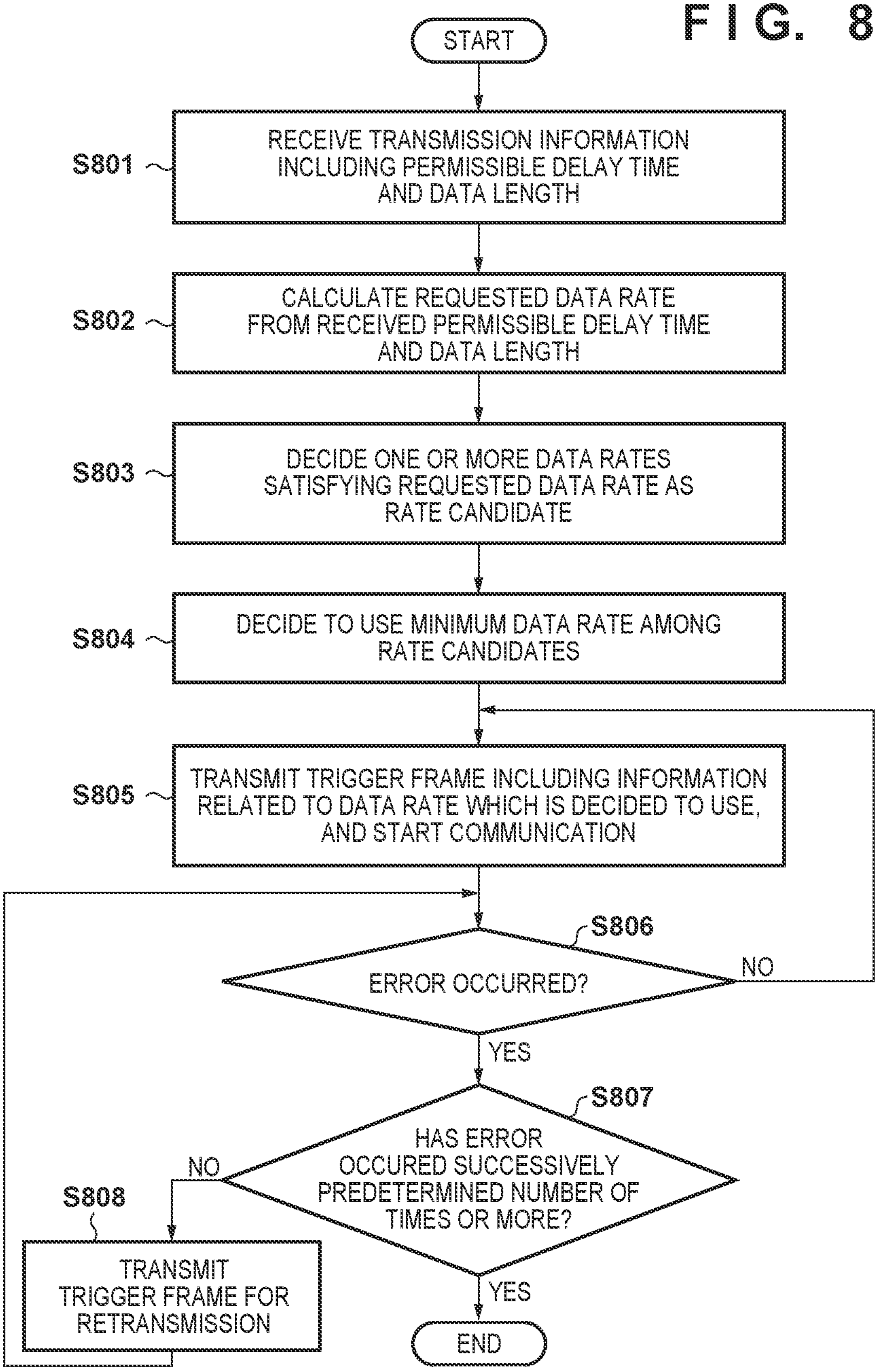
FIG. 8 is a flowchart showing processing executed by the AP according to the first embodiment.

Next, processing executed by the AP 102 having the above-described arrangement will be explained. FIG. 8 is a flowchart showing processing executed by the AP 102 according to the embodiment. The processing sequence can be executed by reading out a computer program stored in the storage unit 201 and executing it by the control unit 202 when the AP 102 decides a data rate to be used.

First, the frame transmission/reception unit 401 of the AP 102 receives, from the wirelessly connected STAs 103 and 104, frames each including transmission information including a permissible delay time and a data length (step S801). Then, the data rate decision unit 402 calculates a data rate requested by each STA from the received permissible delay time and data length (step S802). The requested data rate can be obtained by dividing the data length by the permissible delay time. The data rate decision unit 402 decides, as rate candidates, one or more data rates satisfying the data rate requested by each STA that is calculated in step S802 (step S803).

The processing in step S803 will be explained in detail. The 802.11 standard has a table (Table) representing a theoretical data rate (theoretical value of the data rate) at each resource unit (RU), frequency bandwidth, and number of spatial streams. FIG. 9 shows an example of a table representing a theoretical data rate (Data Rate) with respect to a given RU (26-tone), frequency bandwidth (20 MHz), and number of spatial streams (N=1). The theoretical data rate is a data rate usable for communication with one or more STAs by the AP 102. The table also represents the relationship between the length of a guard interval (GI) capable of implementing each data rate and the MCS (MCS index). Each MCS is associated with a modulation method (Modulation) and a coding rate (R). In the embodiment, the AP 102 is assumed to have a table similar to the table shown in FIG. 9. The data rate decision unit 402 of the AP 102 decides, as rate candidates from the table shown in FIG. 9, one or more data rates equal to or higher than the requested data rate calculated in step S802.

Upon completion of the processing in step S803, the data rate decision unit 402 of the AP 102 decides, from the viewpoint of the error rate, to use a minimum data rate among the rate candidates decided in step S803 (step S804). As the data rate decreases, the error rate with respect to data may decrease. Then, the trigger frame generation unit 403 of the AP 102 generates a normal trigger frame including information about the data rate, the use of which is decided in step S804. More specifically, the trigger frame generation unit 403 generates a normal trigger frame including information (information of at least one of the frequency bandwidth, GI, RU, MCS, and the number of spatial streams) for implementing the data rate, the use of which is decided in step S804. The frame transmission/reception unit 401 of the AP 102 transmits the generated trigger frame to the STAs 103 and 104, and starts UL-MU communication (step S805).

After the start of UL-MU communication, the frame transmission/reception unit 401 of the AP 102 determines whether an error has occurred in communication (step S806). If data has been received normally, the frame transmission/reception unit 401 determines that no error has occurred (NO in step S806), and the process returns to step S805 to repetitively transmit the trigger frame. If the frame transmission/reception unit 401 detects an error in data or determines that no data has been received though the trigger frame was transmitted (a predetermined time has elapsed without receiving data), it determines that an error has occurred (YES in step S806), and the process advances to step S807.

In step S807, the frame transmission/reception unit 401 of the AP 102 determines whether an error has occurred successively a predetermined number of times or more. The user can arbitrarily set the number of times used for determination. If the frame transmission/reception unit 401 determines that an error has occurred successively a predetermined number of times or more (YES in step S807), the communication ends. If the frame transmission/reception unit 401 determines that the number of successive errors is smaller than the predetermined number of times (NO in step S807), the process advances to step S808. In step S808, the trigger frame generation unit 403 of the AP 102 generates a data retransmission trigger frame, and the frame transmission/reception unit 401 transmits the data retransmission trigger frame to at least the target STA in which the error has occurred. By doing so, the AP 102 can prompt the target STA to retransmit data. After that, the process returns to step S806, and the AP 102 repetitively determines whether an error has occurred in communication.

In the processing sequence of FIG. 8, the AP 102 receives permissible delay times and data lengths from the STAs 103 and 104, and calculates requested data rates (step S802). Instead of this, the AP 102 may receive information of requested data rates from the STAs 103 and 104 and decide a data rate to be used. In this case, the processing in step S802 of FIG. 8 is omitted, and the STAs 103 and 104 transmit frames including information of requested data rates in step S701 of FIG. 7. More specifically, in step S701 of FIG. 7, the transmission information frame generation unit 302 of the STA 103/104 calculates a requested data rate from a permissible delay time and a data length and generates a frame including transmission information including the requested data rate, and the frame transmission/reception unit 301 transmits the frame to the AP 102.

When the AP 102 is connected to the STAs 103 and 104, it may decide data rates to be used for the respective STAs 103 and 104, or decide one data rate commonly. In the latter case, for example, in step S803, the AP 102 can decide, as rate candidates, one or more data rates equal to or higher than a higher requested data rate of two requested data rates calculated in step S802, and decide a minimum data rate among the rate candidates in step S804. Similarly when the STAs 103 and 104 notify the AP 102 of requested data rates, the AP 102 can decide, as rate candidates, one or more data rates equal to or higher than a higher requested data rate, and decide a minimum data rate among the rate candidates in step S804.

As described above, according to the first embodiment, the AP 102 decides a data rate to be used for communication so as to satisfy requested data rates based on permissible delay times and data lengths announced from the STAs 103 and 104. This can reduce generation of an error and implement low-delay communication.

Second Embodiment

In the first embodiment, from the viewpoint of the error rate, the AP 102 decides the use of a minimum data rate among rate candidates satisfying a requested data rate calculated from a permissible delay time and a data length. However, in terms of the frequency use efficiency, there are cases where it is preferable that the data rate is high, such as when there are a plurality of terminal apparatuses, like in an example of the network constituted by one AP 102 and two STAs 103 and 104 as shown in FIG. 1. In the second embodiment, a data rate to be used for communication is decided in consideration of even the frequency use efficiency. Note that a description of features similar to those in the first embodiment will be omitted.

(Processing of STA)

Figure 10:
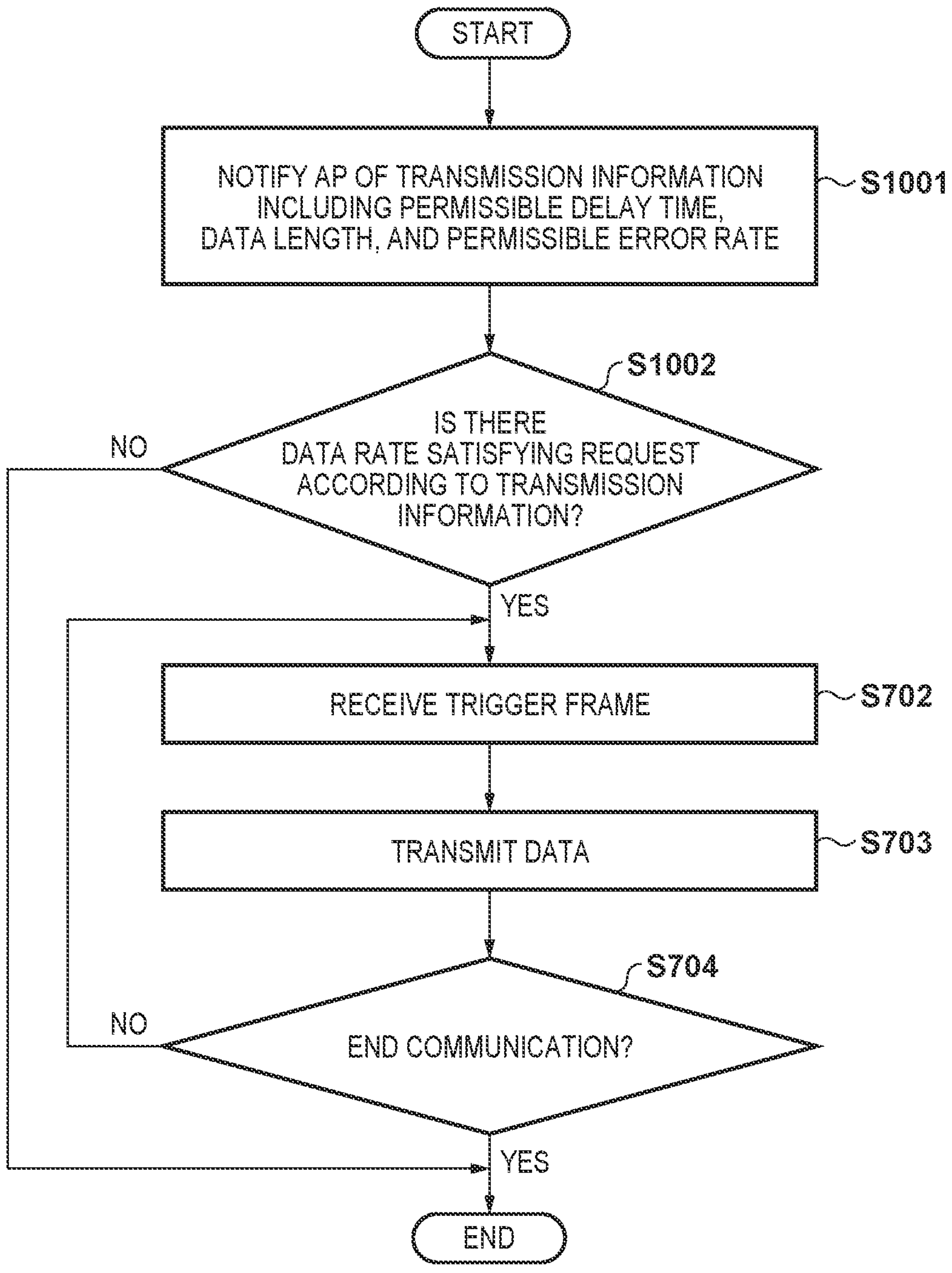
FIG. 10 is a flowchart showing processing executed by a STA according to the second embodiment.

FIG. 10 is a flowchart showing processing executed by STAs 103 and 104 according to the embodiment. Although the STA 103 will be exemplified here, the STA 104 can also perform similar processing. The processing sequence can be executed by reading out a computer program stored in a storage unit 201 and executing it by a control unit 202 when the STA 103 starts communication. In the flowchart of FIG. 10, the same reference numerals as those in the flowchart of FIG. 7 described in the first embodiment denote the same or similar processes, and a repetitive description thereof will be omitted.

First, the transmission information frame generation unit 302 of the STA 103 generates a frame including transmission information. In the embodiment, the transmission information frame generation unit 302 sets, in the transmission information, at least a permissible delay time, data length, and permissible error rate requested of the AP 102. The frame transmission/reception unit 301 transmits the frame to the AP 102 to notify the AP 102 of the transmission information including the permissible delay time, the data length, and the permissible error rate (step S1001). Then, the frame transmission/reception unit 301 of the STA 103 determines whether there is a data rate satisfying the request according to the notified transmission information (step S1002). Based on a response frame from the AP 102, the frame transmission/reception unit 301 of the STA 103 can determine whether there is a data rate satisfying the request. Details of the processing will be explained in the description of processing of the AP 102 in the embodiment with reference to FIGS. 11A and 11B.

If the frame transmission/reception unit 301 of the STA 103 receives, from the AP 102, a response frame representing that there is no data rate satisfying the request according to the transmission information (NO in step S1002), the process ends without transmitting data. In other cases, the frame transmission/reception unit 301 of the STA 103 determines that there is a data rate satisfying the request according to the transmission information (YES in step S1002), the process advances to processing in step S702. Subsequent processing is similar to that in FIG. 7.

(Processing of AP)

Figure 11A:
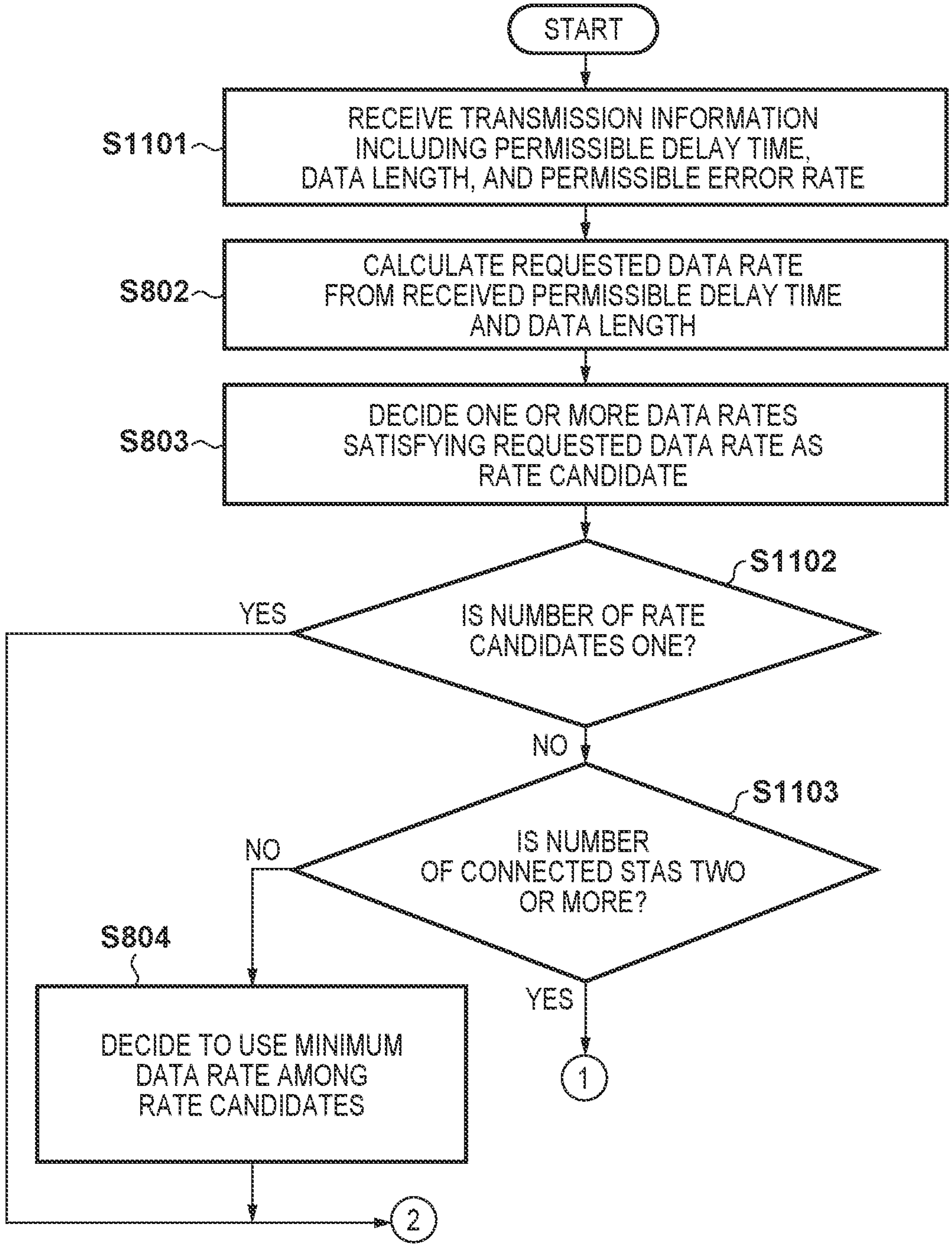
FIG. 11A is a flowchart showing processing executed by an AP according to the second embodiment.
Figure 11B:
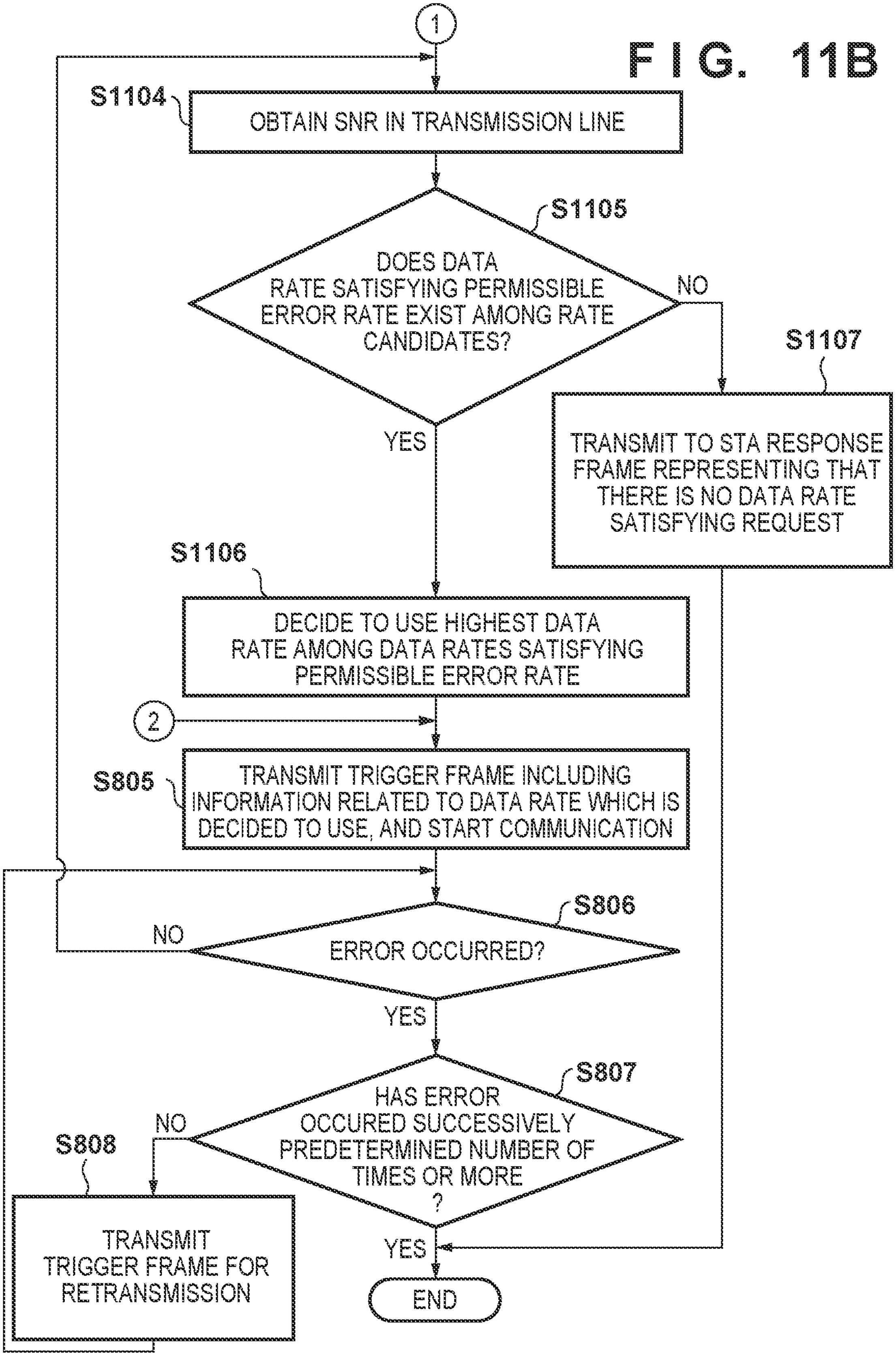
FIG. 11B is a flowchart showing processing executed by the AP according to the second embodiment.

FIGS. 11A and 11B are flowcharts showing processing executed by the AP 102 according to the embodiment. The processing sequence can be executed by reading out a computer program stored in the storage unit 201 and executing it by the control unit 202 when the AP 102 decides a data rate to be used. In the flowcharts of FIGS. 11A and 11B, the same reference numerals as those in the flowchart of FIG. 8 described in the first embodiment denote the same or similar processes, and a repetitive description thereof will be omitted.

First, the frame transmission/reception unit 401 of the AP 102 receives, from the STAs 103 and 104, frames each including transmission information including a permissible delay time, a data length, and a permissible error rate (step S1101). After subsequent processes in steps S802 and S803, a data rate decision unit 402 of the AP 102 determines whether the number of rate candidates decided in step S803 is one (step S1102). If the number of decided rate candidates is one (YES in step S1102), the process advances to step S805 and subsequent processing is similar to that in FIG. 8. If the number of decided rate candidates is more than one (NO in step S1102), the process advances to step S1103.

In step S1103, the data rate decision unit 402 of the AP 102 determines whether the number of connected STAs is two or more. If the number of connected STAs is two or more (YES in step S1103), the process advances to processing in step S1104. If the number of connected STAs is smaller than two (NO in step S1103), the process advances to processing in step S804 and subsequent processing is similar to that in FIG. 8. In the embodiment, the AP 102 is connected to the STAs 103 and 104, and the process advances to step S1104.

In step S1104, the data rate decision unit 402 of the AP 102 obtains Signal-to-Noise Ratio (SNR) as a transmission quality in a transmission line between the AP 102 and each of the STAs 103 and 104. The SNR can be obtained from a Channel State Information (CSI) report from each STA, but the obtaining method is not limited to this. For example, the SNR may be obtained from a frame including Channel Measurement Feedback Element or a newly defined frame.

Upon completion of the processing in step S1104, the data rate decision unit 402 of the AP 102 calculates an error rate for each data rate of a rate candidate decided in step S803. The relationship between the error rate for each data rate and the SNR will be described later. The data rate decision unit 402 determines whether a data rate satisfying the permissible error rate received (obtained) in step S1101 exists among the rate candidates, that is, there is a data rate at which the calculated error rate is equal to or lower than the permissible error rate (step S1105). If a data rate satisfying the permissible error rate exists among the rate candidates (there is a data rate at which the calculated error rate is equal to or lower than the permissible error rate) (YES in step S1105), the process advances to step S1106. In other cases (NO in step S1105), the process advances to step S1107.

The relationship between the error rate for each data rate and the SNR will be described here. As for each modulation method that implements each data rate, the relationship between an error rate Pb and the SNR is given by the following equations.

In a case where the modulation method is Binary Phase Shift Keying (BPSK) and Quadrature Phase Shift Keying (QPSK), $$P_b=Q(\sqrt{2\mathrm{SNR}}) \tag{1}$$

In a case where the modulation method is Quadrature Amplitude Modulation (QAM), $$P_b = \frac{4}{k}\left(1 - \frac{1}{\sqrt{M}}\right)Q\left(\sqrt{\frac{3SNR}{M-1}}\right) \tag{2}$$

where M is the number of symbols:

$$M=16,\ 64,\ 256,\ 1024,\ 4096 \tag{3}$$

k is the number of bits per symbol:

$$k=\log_2 M \tag{4}$$

Common to equations (1) and (2), Q(x) represents the probability at which a single sample obtained through a random process with a Gaussian probability density function having an average of 0 and a dispersion of 1 is equal to or larger than x, and is given by equation (5):

$$Q(x) = \frac{1}{\sqrt{2\pi}}\int_x^\infty e^{\frac{t^2}{2}}\,dt = \frac{1}{2}\mathrm{erfc}\left(\frac{x}{\sqrt{2}}\right),\ x \geq 0 \tag{5}$$

In the embodiment, the above equations are stored in advance in the storage unit 201 of the AP 102, and the data rate decision unit 402 calculates an error rate for each data rate by using these equations. Alternatively, the data rate decision unit may calculate an error rate for each data rate by another means. For example, a table representing an error rate with respect to the SNR for each data rate may be stored in the storage unit 201 of the AP 102, and after calculating a permissible error rate in step S1105, the data rate decision unit 402 may look up the table and read out a data rate at which the error rate is equal to or lower than the permissible error rate.

In step S1107 to which the process advances if NO in step S1105, the frame transmission/reception unit 401 of the AP 102 transmits, to the STAs 103 and 104, a response frame representing that there is no data rate satisfying the request according to the transmission information. By doing so, the AP 102 notifies the STAs 103 and 104 that there is no data rate satisfying the permissible error rate. The frame used may be a newly created management frame or control frame, or a frame to which a newly created Element ID is assigned.

In step S1106 to which the process advances if YES in step S1105, the data rate decision unit 402 of the AP 102 decides to use a highest data rate among data rates (data rates equal to or lower than the permissible error rate) satisfying the permissible error rate. Processing after step S1106 is similar to that in FIG. 8. However, if the AP 102 determines NO in step S806, the process returns to step S1104. Thus, even when the radio propagation environment of the transmission line is dynamic such that the distance between the AP 102 and the STA 103/104 varies, the error rate can be calculated every time to properly decide a data rate to be used. However, this is an exemplary processing sequence. For example, when the radio propagation environment of the transmission line is static, the SNR may not greatly change. If the AP 102 determines NO in step S806, the process may return to step S805. This can omit processing of obtaining the SNR by the AP 102 and deciding a data rate to be used every time the process is repeated, and can reduce the processing load.

Further, in FIGS. 11A and 11B, if the AP 102 determines NO in step S1105, the process advances to step S1107 to transmit a response frame representing that there is no data rate satisfying a request according to transmission information, and then end communication. Instead, the process may advance to step S804 without ending communication. By doing so, the AP 102 can communicate at a data rate at which the error rate becomes minimum, while satisfying the requested data rate. In this case, process step S1001 by the STAs 103 and 104 in FIG. 10 is omitted, and the operation becomes similar to that in FIG. 5 according to the first embodiment.

As described above, according to the second embodiment, the AP 102 decides a data rate to be used in consideration of even the number of STAs connected to the AP 102. The AP 102 can flexibly cope with even a network environment where a plurality of STAs are connected, and can increase the frequency use efficiency while satisfying an error rate permitted by the STA.

Third Embodiment

The above embodiments have described an example in which the AP 102 operates to properly decide a data rate to be used from the viewpoint of either the frequency use efficiency or the error rate in consideration of connected STAs. In contrast, considering the viewpoint of power consumption, the power is saved much more at a higher data rate because the power consumption greatly depends on the data transmission time. The third embodiment assumes a use case where power saving takes top priority, and a data rate to be used for communication is decided in consideration of power saving. Note that a description of features similar to those in the first and second embodiments will be omitted.

(Processing of STA)

Processing by STAs 103 and 104 is similar to that in FIG. 10 described in the second embodiment. However, transmission information transmitted in step S1001 includes at least a permissible delay time, data length, permissible error rate, and information about power consumption requested of an AP 102. As described above, the information about power consumption represents whether to give priority to power consumption (whether power-saving communication is requested).

(Processing of AP)

Figure 12:
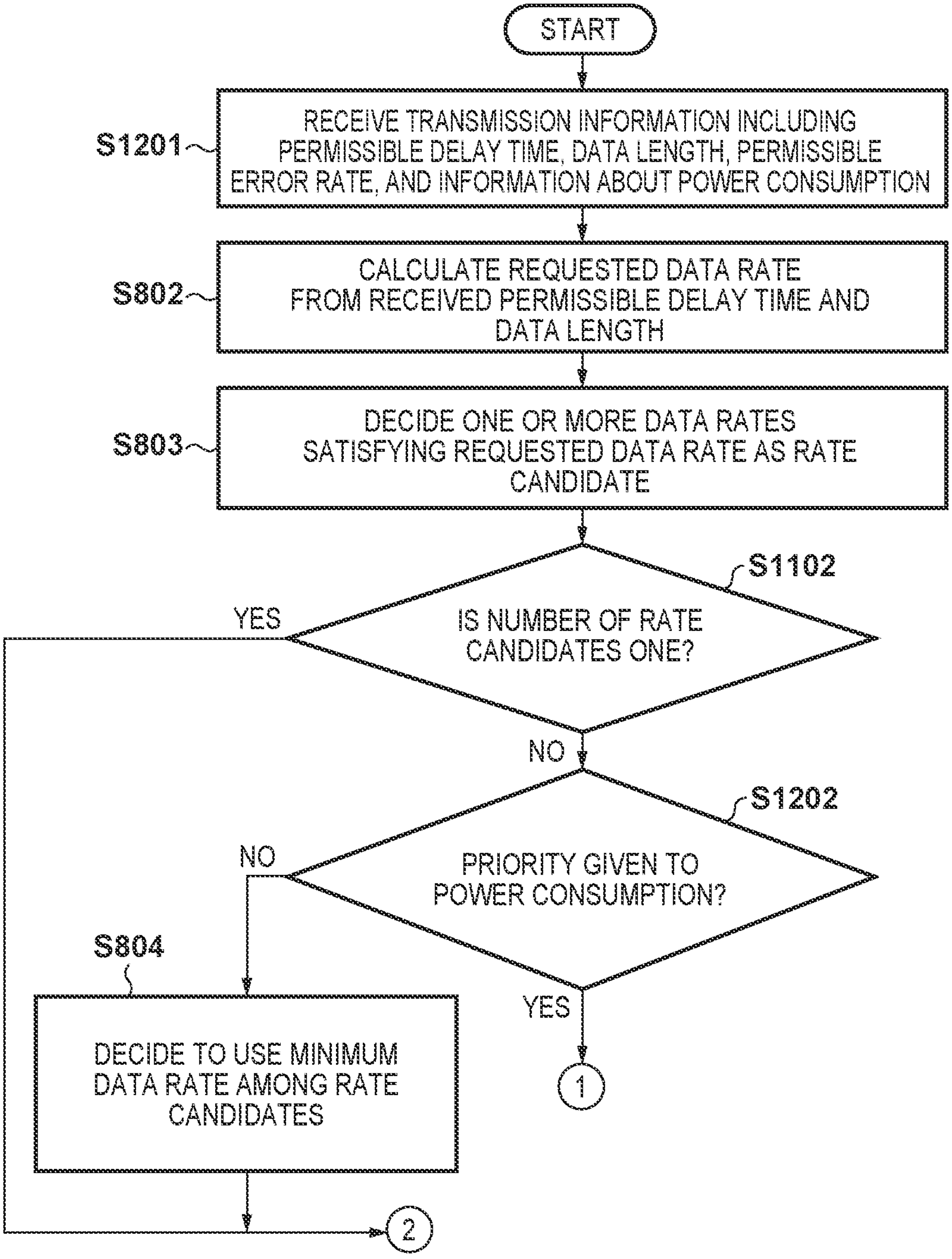
FIG. 12 is a flowchart showing processing executed by an AP according to the third embodiment.

FIG. 12 is a flowchart showing processing executed by the AP 102 according to the embodiment. The processing sequence can be executed by reading out a computer program stored in a storage unit 201 and executing it by a control unit 202 when the AP 102 decides a data rate to be used. In the flowchart of FIG. 12, the same reference numerals as those in the flowchart of FIG. 8 described in the first embodiment or the flowcharts of FIGS. 11A and 11B described in the second embodiment denote the same or similar processes, and a repetitive description thereof will be omitted.

First, the frame transmission/reception unit 401 of the AP 102 receives, from the STAs 103 and 104, frames each including transmission information including a permissible delay time, a data length, a permissible error rate, and information about power consumption (step S1201). In step S1102 after subsequent processes in steps S802 and S803, if a data rate decision unit 402 of the AP 102 determines that the number of rate candidates decided in step S803 is more than one (NO in step S1102), the process advances to step S1202.

In step S1202, the data rate decision unit 402 of the AP 102 determines whether the information about power consumption included in the transmission information represents that priority is given to power consumption. If the information about power consumption represents that priority is given to power consumption (YES in step S1202), the process advances to step S1104. If the information about power consumption represents that no priority is given to power consumption (NO in step S1202), the process advances to step S804. In either case, subsequent processing is similar to that in FIG. 11B.

As described above, according to the third embodiment, the AP 102 can cope with even a network environment requiring more power-saving, and can perform a more power-saving operation while satisfying an error rate permitted by the STA.

According to the present invention, a communication data rate can be decided to reduce a delay caused by a communication error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:

a storage storing information of a plurality of data rates usable for communication with at least one other communication apparatus;

at least one memory that stores a set of instructions; and at least one processor that executes the instructions, the instructions, when executed, causing the communicating apparatus to perform operations comprising:

receiving, from the at least one other communication apparatus wirelessly connected to the communication apparatus, first information representing a permissible delay time until completion of data reception by the communication apparatus after data transmission by the at least one other communication apparatus, a data length of data transmitted at once by the at least one other communication apparatus and a permissible error rate, which are requested by the at least one other communication apparatus;

calculating, from the permissible delay time and the data length, a requested data rate requested by the at least one other communication apparatus;

deciding, from the plurality of data rates stored in the storage, at least one data rate not lower than the requested data rate;

deciding a minimum data rate among the decided at least one data rate as a data rate used for communication with the at least one other communication apparatus; and notifying the at least one other communication apparatus of second information about the decided data rate, wherein if the communication apparatus determines that a plurality of other communication apparatuses are wirelessly connected, the communication apparatus decides a data rate used for communication with the plurality of other communication apparatuses, based on a signal-to-noise ratio between the plurality of other communication apparatuses and the communication apparatus and the permissible error rate.

2. The communication apparatus according to claim 1, wherein the communication apparatus calculates, based on the signal-to-noise ratio, an error rate at the decided at least one data rate, and decides, among the at least one data rate, a highest data rate at which the error rate becomes not higher than the permissible error rate, as a data rate used for communication with the plurality of other communication apparatuses.

3. The communication apparatus according to claim 1, wherein if the communication apparatus determines that another communication apparatus is wirelessly connected, the communication apparatus decides, among the decided at least one data rate, a minimum data rate as a data rate used for communication with the other communication apparatus.

4. The communication apparatus according to claim 1, wherein the first information further represents whether the at least one other communication apparatus requests power-saving communication, and if the first information represents that the power-saving communication is requested, the communication apparatus decides, among the decided at least one data rate, a data rate used for communication with the at least one other communication apparatus, based on a signal-to-noise ratio between the at least one other communication apparatus and the communication apparatus and the permissible error rate.

5. The communication apparatus according to claim 4, wherein the communication apparatus calculates an error rate at each of the decided at least one data rate based on the signal-to-noise ratio, and decides, among the at least one data rate, a highest data rate at which the error rate becomes not higher than the permissible error rate, as a data rate used for communication with the at least one other communication apparatus.

6. The communication apparatus according to claim 1, wherein the communication apparatus notifies the at least one other communication apparatus of the second information by a trigger frame.

7. The communication apparatus according to claim 1, wherein the second information includes at least one of a frequency bandwidth, a length of a guard interval, allocation information of a resource unit, Modulation and Coding Scheme (MCS) information, and the number of spatial streams for implementing the data rate decided by the communication apparatus.

8. A control method of a communication apparatus, comprising:

receiving, from at least one other communication apparatus wirelessly connected to the communication apparatus, first information representing a permissible delay time until completion of data reception by the communication apparatus after data transmission by the at least one other communication apparatus, a data length of data transmitted at once by the at least one other communication apparatus, and a permissible error rate, which are requested by the at least one other communication apparatus;

calculating, from the permissible delay time and the data length, a requested data rate requested by the at least one other communication apparatus;

deciding, from a plurality of data rates usable for communication with the at least one other communication apparatus, at least one data rate not lower than the requested data rate;

deciding a minimum data rate among the decided at least one data rate as a data rate used for communication with the at least one other communication apparatus; and notifying the at least one other communication apparatus of second information about the decided data rate, wherein if the communication apparatus determines that a plurality of other communication apparatuses are wirelessly connected, the communication apparatus decides a data rate used for communication with the plurality of other communication apparatuses, based on a signal-to-noise ratio between the plurality of other communication apparatuses and the communication apparatus and the permissible error rate.

9. A non-transitory computer-readable storage medium that stores a program for causing a computer included in a communication apparatus to perform operations including:

receiving, from at least one other communication apparatus wirelessly connected to the communication apparatus, first information representing a permissible delay time until completion of data reception by the communication apparatus after data transmission by the at least one other communication apparatus, a data length of data transmitted at once by the at least one other communication apparatus, and a permissible error rate, which are requested by the at least one other communication apparatus;

calculating, from the permissible delay time and the data length, a requested data rate requested by the at least one other communication apparatus;

deciding, from a plurality of data rates usable for communication with the at least one other communication apparatus, at least one data rate not lower than the requested data rate;

deciding a minimum data rate among the decided at least one data rate as a data rate used for communication with the at least one other communication apparatus; and notifying the at least one other communication apparatus of second information about the decided data rate, wherein if the communication apparatus determines that a plurality of other communication apparatuses are wirelessly connected, the communication apparatus decides a data rate used for communication with the plurality of other communication apparatuses, based on a signal-to-noise ratio between the plurality of other communication apparatuses and the communication apparatus and the permissible error rate.

* * * * *